United States Patent
Kakehi

(10) Patent No.: US 7,039,436 B1
(45) Date of Patent: May 2, 2006

(54) MOBILE COMMUNICATION TERMINAL

(75) Inventor: Yuji Kakehi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/936,293

(22) PCT Filed: Jan. 12, 2000

(86) PCT No.: PCT/JP00/00102

§ 371 (c)(1),
(2), (4) Date: Jan. 24, 2002

(87) PCT Pub. No.: WO01/52576

PCT Pub. Date: Jul. 19, 2001

(51) Int. Cl.
*H04B 7/00* (2006.01)
*H04Q 7/20* (2006.01)

(52) U.S. Cl. ............... 455/525; 455/502; 455/503; 455/552; 455/553; 370/503

(58) Field of Classification Search ............ 455/437, 455/440–443, 502, 67.11, 136, 164.1, 182.2, 455/192.2, 196.1, 525, 550; 370/503; 375/362
See application file for complete search history.

(56) References Cited

U.S. PATENT DOCUMENTS

| | | | |
|---|---|---|---|
| 5,109,390 A | | 4/1992 | Gilhousen et al. |
| 5,239,667 A | * | 8/1993 | Kanai ..................... 455/10 |
| 5,363,376 A | * | 11/1994 | Chuang et al. ........ 370/332 |
| 5,490,174 A | * | 2/1996 | Shin et al. ............. 375/316 |
| 5,509,051 A | | 4/1996 | Barnett et al. |
| 5,661,765 A | * | 8/1997 | Ishizu ..................... 375/376 |
| 5,701,586 A | * | 12/1997 | Tabbane et al. ....... 455/422.1 |
| 5,732,336 A | * | 3/1998 | Tochihara ............... 455/136 |
| 5,844,436 A | * | 12/1998 | Altmann ................ 327/156 |
| 5,914,592 A | * | 6/1999 | Saito ................... 324/121 R |
| 5,960,335 A | * | 9/1999 | Umemoto et al. ..... 455/226.2 |
| 5,991,901 A | * | 11/1999 | Mulford et al. ........ 714/704 |
| 6,208,871 B1 | * | 3/2001 | Hall et al. ............... 455/517 |
| 6,342,849 B1 | * | 1/2002 | Fujiwara ................ 341/132 |
| 6,693,955 B1 | * | 2/2004 | Arimitsu ................ 375/150 |
| 2002/0122396 A1 | * | 9/2002 | Terasawa ............... 370/331 |
| 2003/0142656 A1 | * | 7/2003 | Padovani et al. ...... 370/347 |

FOREIGN PATENT DOCUMENTS

| | | |
|---|---|---|
| EP | 0 765 078 A2 | 3/1997 |
| EP | 0 876 002 A2 | 11/1998 |
| JP | 02095015 A | 4/1990 |
| JP | 03107228 A | 5/1991 |

(Continued)

*Primary Examiner*—Nay Maung
*Assistant Examiner*—Sujatha Sharma
(74) *Attorney, Agent, or Firm*—Rothwell, Figg, Ernst & Manbeck, PC

(57) ABSTRACT

A mobile communication terminal includes a receiver (2) receiving a radio waves from a base station, a sampling unit (3) sampling a signal received by the receiver (2), a demodulator (5) demodulating the signal sampled by the sampling unit (3), a selector (4) selecting a most significant cell/sector based on data demodulated by the demodulator (5), using at least two different thresholds, and a path detector (6) detecting a primary path based on the signal sampled by the sampling unit (3). Since the selector (4) selects the most significant cell/sector based on the signal sampled by the sampling unit (3), using at least two different thresholds, it is possible to prevent deterioration of the receiving quality due to frequent transition of the main selector.

15 Claims, 12 Drawing Sheets

FOREIGN PATENT DOCUMENTS

| | | | |
|---|---|---|---|
| JP | 03268697 | * | 11/1991 |
| JP | 06326700 | A | 11/1994 |
| JP | 09187055 | A | 7/1997 |
| JP | 09289670 | A | 11/1997 |
| JP | 10075476 | * | 3/1998 |
| WO | WO 97/02716 | A1 | 1/1997 |

* cited by examiner

FIG. 1
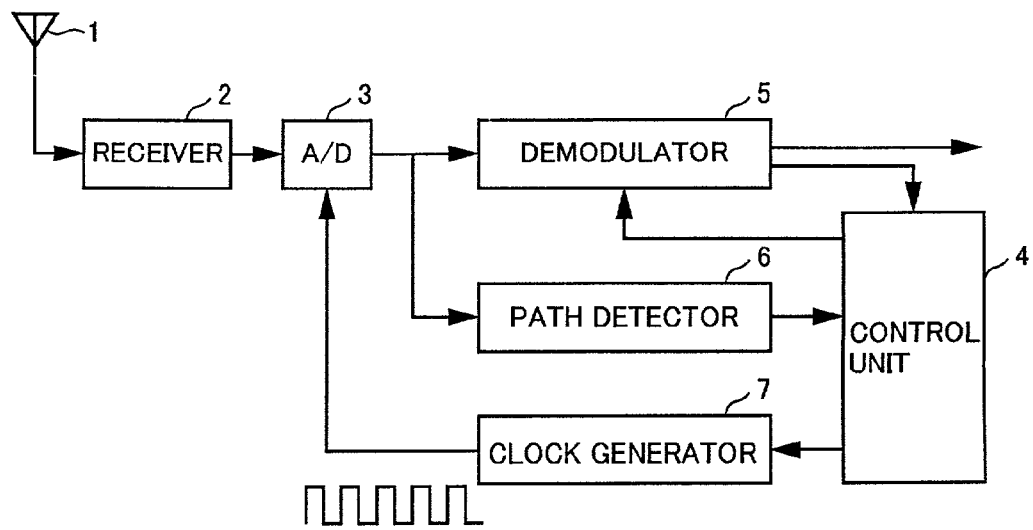
FIG. 2A
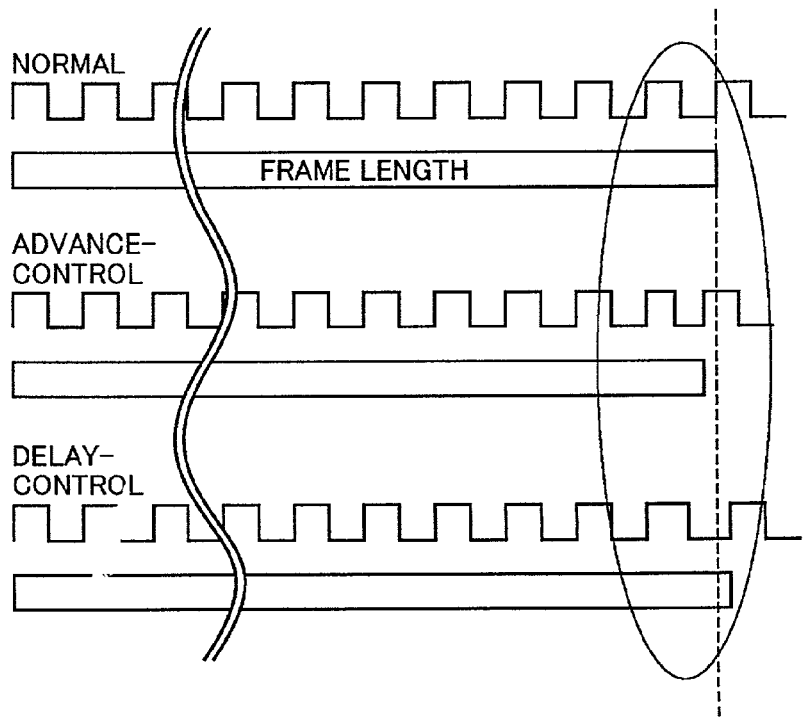
FIG. 2B
FIG. 2C

MOBILE COMMUNICATION TERMINAL

TECHNICAL FIELD

The present invention relates to a mobile communication terminal employing a code division multiplex method for communication, and particularly a mobile communication terminal which tracks a path of the maximum receiving level.

BACKGROUND ART

In recent years, mobile communication terminals such as a portable telephone and a mobile telephone have been widely used, and various kinds of multiple access methods have been developed for use in such mobile communication systems. Among them, a CDMA (Code Division Multiple Access) method has been employed in portable telephones and others because it has high quality reception capability through the exploitation of multipath fading, and can achieve a high utilization efficiency of radio resource (can increase a subscriber capacity). A state of communication to a base station may be impaired due to, e.g., movement of a mobile station such as a portable telephone employing the CDMA system. In this case, so-called hand-over, which is the operation of switching to the communication channel of another base station, is performed for maintaining a better communication state.

FIG. 13 shows occurrence of the hand-over. In general, a plurality of base stations (BS1–BS5) are arranged regularly, and cells of the base stations form a regular polygon if these base stations are arranged to cover a service area with as high an electric field as possible, as is well known and shown in FIG. 13. When a mobile communication terminal (MS) performs the communication, it receives a plurality of radio waves from each base station. When the mobile communication terminal moves through a boundary of an electric field polygon, so-called cells or sectors, the mobile communication terminal and MS exchanges the access channel to keep communication. That is called hand-over. The hand-over is executed based on the MS's measurement of each cell, and a maximum level channel is usually used. When fading occurs, the channel at the maximum level frequently changes so that the hand-over is unexpectedly performed.

For the mobile communication terminal, such a method is generally known that changes the timing for sampling clock for performing timing tracking. According to the timing control for the sampling clock by a digital circuit, however, the accuracy of the change becomes low. In the case where the foregoing hand-over is frequently performed, therefore, the quality of data receiving operation deteriorates.

The invention has been developed for overcoming the above problem, and a first object of the invention is to provide a mobile communication terminal, which can prevent lowering of a receiving quality due to frequent switching of a most significant cell/sector.

A second object of the invention is to provide a mobile communication terminal, which can prevent lowering of a receiving quality due to frequent switching of a primary path.

A third object of the invention is to provide a mobile communication terminal, which can produce sampling clocks of different timing by a simple structure.

DISCLOSURE OF THE INVENTION

According to one aspect of the present invention, a mobile communication terminal is equipped with a receiver to receive a radio waves from a base station; a sampling unit to sample the signals received by the receiver; a demodulating unit to demodulate the signals sampled by the sampling unit; a selector to select the most significant cell/sector based on the data demodulated by the demodulator; a path detector to detect the primary path based on the data sampled by the sampling unit; and a clock generator to generate a sampling clock with changed timing by inserting different frequency clocks into sampling clocks based on the primary path detected by the path detector, and supply the produced sampling clock to the sampling unit.

The clock generator generates sampling clocks with changed timing by inserting different frequency clocks into sampling clocks, the sampling timing of the sampling unit can be changed easily.

Preferably, the clock generator inserts a single clock with a different frequency to change sampling clock timing.

Since only one clock with a different frequency is inserted by the clock generator, the sampling timings can be changed even more easily.

More preferably, the mobile communication terminal is a mobile communication terminal adopts a CDMA system.

According to another embodiment of the invention, a mobile communication terminal is equipped with a receiver to receive radio waves from a base station; a sampling unit to sample the signals received by the receiver; a demodulator to demodulate the signals sampled by the sampling unit; a selector to select the most significant cell/sector based on the data demodulated by the demodulator; a path detector to detect a multiple of paths based on the signals sampled by the sampling unit; a determining unit to detect the primary path among several paths detected by the path detector, and determine whether the primary path should be changed or not, based on the forward or backward protection states of the primary path; and a clock generator to generate sampling clocks with changed timing based on the primary path determination by the determining unit, and supply the sampling clocks to the sampling unit.

The determining unit detects the primary path among the several paths detected by the path detector, and determines whether the primary path should be changed or not, based on the forward or backward protection states of the primary path. This procedure can prevent the degradation in receiving quality due to frequent transition of the primary path.

Preferably, the determining unit determines whether the primary path should be changed or not, by shifting the states between the first state in which no primary path is present, the second state in which the primary path is in backward protection, the third state in which the primary path is fixed, and the fourth state in which the primary path is in forward protection.

The determining unit selects the primary path by shifting the states between the above four states, which makes possible to change the primary path properly.

More preferably, when the primary path is detected, the determining unit shifts the states from the first state to the second state, and determines that the primary path should be changed.

The determining unit changes the primary path only when the states shifts from the first state to the second state, which makes it possible to prevent degradation in the receiving quality due to frequent transition of the primary path.

More preferably, the determining unit shifts the states from the second state to the third state when the primary path is continuously detected for a specified number of times.

The determining unit shifts the states from the second state to the third state when the primary path is continuously detected for a specified number of times, which makes it possible to prevent degradation in the receiving quality due to frequent transition of the primary path.

More preferably, the determining unit shifts the states from the fourth state to the first state when the primary path is not continuously detected for a specified number of times.

The determining unit shifts the states from the fourth state to the first state only when the primary path is not continuously detected for a specified number of times, which makes it possible to prevent degradation in the receiving quality due to frequent transition of the primary path.

More preferably, the clock generator generates the sampling clock with changed timing based on the determination by the determining unit upon every passage of a specified time.

The clock generator changes the timing of the sampling clock only when a specified time elapses, which makes it possible to prevent degradation in the receiving quality due to frequent transition of the primary path.

More preferably, the mobile communication terminal adopts a CDMA system.

By applying the invention to the CDMA-based mobile communication terminal path tracking can be properly performed.

According to still another aspect of the invention, a mobile communication terminal is equipped with a receiver to receive radio waves from a base station; a sampling unit to sample the signals received by the receiver; a demodulator to demodulate the signals sampled by the sampling unit; a selector to select the most significant cell/sector based on the data demodulated by the demodulator, using at least two different thresholds; and a path detector to detect a primary path based on the signals sampled by the sampling unit.

The selector uses at least two different thresholds to select the most significant cell/sector based on the data demodulated by the demodulator, which makes it possible to prevent degradation in the receiving quality due to frequent transition of the most significant cell/sector.

Preferably, the selector selects the sector with the maximum receiving level as the new most significant cell/sector when the receiving level of the current most significant cell/sector is lower than the first threshold, and the above maximum receiving level of the sector is equal to or higher than the second threshold which is higher than the first threshold.

The selector changes the most significant cell/sector only when the receiving level of the most significant cell/sector is lower than the first threshold, and the maximum receiving level of the sectors is equal to or higher than the second threshold which is higher than the first threshold. This procedure can prevent degradation in the receiving quality due to frequent transition of the most significant cell/sector.

Preferably, the selector selects the sector with the maximum quality of channels/channel quality as the new most significant cell/sector when the quality of channels/channel quality of the current most significant cell/sector remains lower than the first threshold for the period specified by the second threshold or longer.

The selector changes the most significant cell/sector only when the quality of channels/channel quality of the current most significant cell/sector is lower than the first threshold for the second threshold period or longer. This procedure can prevent degradation in receiving quality due to frequent transition of the most significant cell/sector.

Preferably, the selector selects the sector of the maximum quality of channels/channel quality as the new most significant cell/sector when the quality of channels/channel quality difference between the sector with maximum quality of channels/channel quality and the current most significant cell/sector exceeds the first threshold for the period specified by the second threshold or longer.

The selector selects the sector with the maximum quality of channels/channel quality as the new most significant cell/sector when the quality of channels/channel quality difference between the sector with maximum quality of channels/channel quality and the current most significant cell/sector exceeds the first threshold for the period specified by the second threshold or longer. This procedure can prevent degradation in the receiving quality due to frequent transition of the most significant cell/sector.

More preferably, the mobile communication terminal adopts CDMA system.

By applying the invention to the CDMA-based mobile communication terminal path tracking can be properly performed.

BRIEF DESCRIPTION OF THE DRAWINGS

FIG. 1 shows a block diagram of a general structure of a mobile communication terminal in the first embodiment of the invention;

FIGS. 2A–2C show a concept of change in sampling clock timings;

BEST MODE FOR CARRYING OUT THE INVENTION

Figure 3:
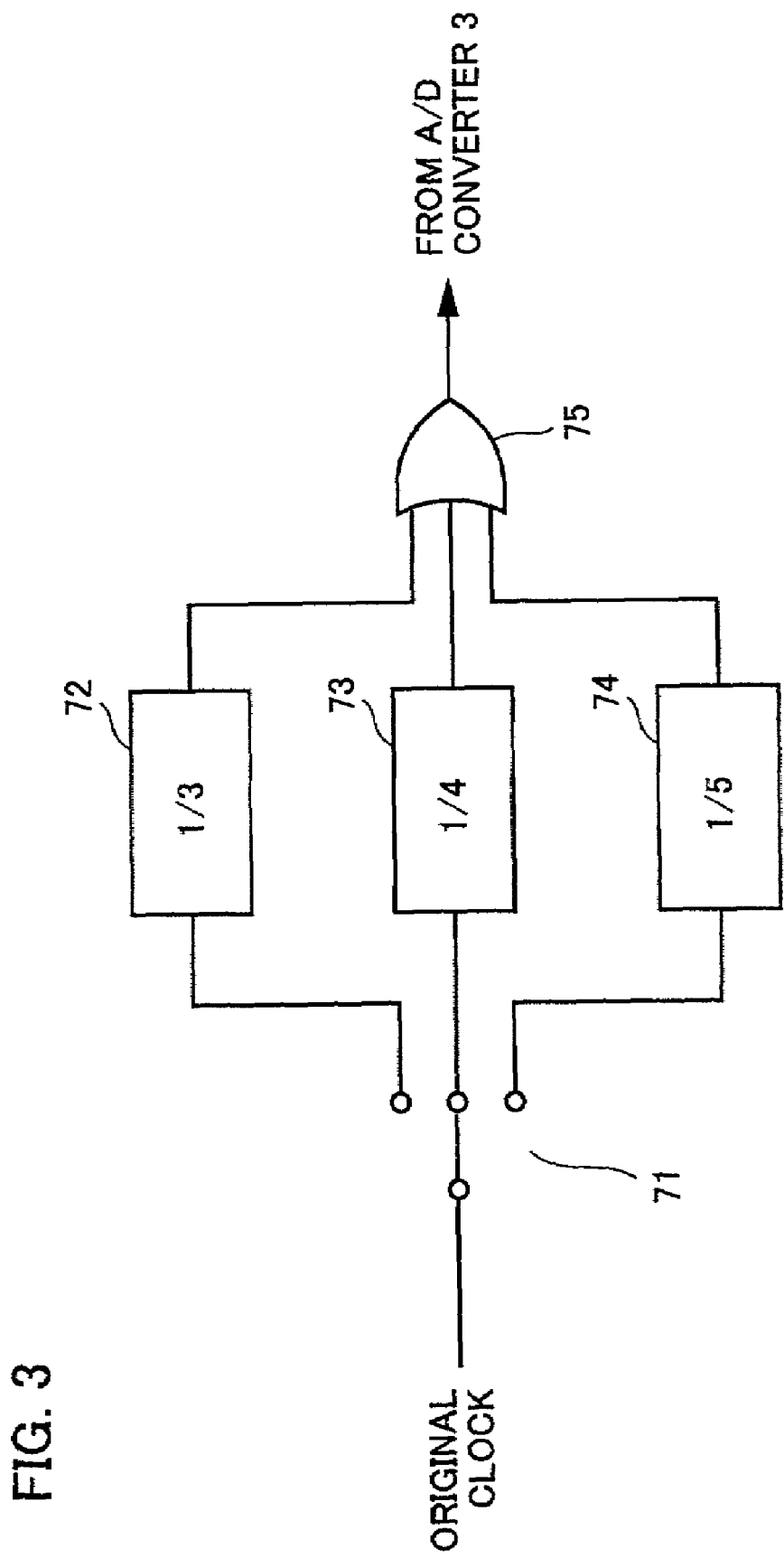
FIG. 3 shows a general structure of a clock generator 7.

More details of the invention are described in the following with reference to the accompanying diagrams.

FIRST EMBODIMENT

FIG. 1 shows the general structure of a mobile communication terminal in the first embodiment of the present invention. This mobile communication terminal is equipped with antenna 1, receiver 2 which receives weak radio waves sent from a base station via antenna 1, A/D (Analog/Digital) converter 3 which converts received analog signals into digital signals for output, control unit 4 which performs overall control of the mobile communication terminal, a demodulator 5 which demodulates the received signals sent from A/D converter 3, path detector 6 which detects a tracking path (primary path), and clock generator 7 which generates a sampling clock with changed timing. Control unit 4 controls clock generator 7 in accordance with the primary path detected by path detector 6, and changes the timing of the sampling clock. A/D converter 3 samples the received signals using the sampling clocks generated from clock generator 7.

FIGS. 2A–2C show a conceptual diagram of timing change in a sampling clock. FIG. 2A shows a normal sampling clock with a constant period which is supplied to A/D converter 3. When control unit 4 determines that the timing of the sampling clock is delayed relative to the frame, only a single short-pulse clock is inserted into the last sampling clock of the frame, as shown in FIG. 2B, to advance the timing of the sampling clock. When control unit 4 determines that the timing of the sampling clock is advanced relative to the frame, only a single long-pulse clock is inserted into the last sampling clock of the frame, as shown in FIG. 2C, to delay the timing of the sampling clock.

FIG. 3 shows the general structure of clock generator 7. Clock generator 7 includes switch 71, 1/3 frequency divider circuit 72 which divides an original clock frequency to output a clock frequency reduced to 1/3, 1/4 frequency divider circuit 73 which divides the original clock frequency to output a clock frequency reduced to 1/4, 1/5 frequency divider circuit 74 which divides an original clock frequency to output a clock frequency reduced to 1/5, and OR circuit 75. The dividing ratios of divider circuits 72–74 are set to 1/3–1/5 to simplify description, but these ratios are not conditional.

To generate a normal sampling clock timing as shown in FIG. 2A, switch 71 is operated to supply the original clock into 1/4 divider circuit 73.

To advance the sampling clock timing as shown in FIG. 2B, switch 71 is operated to supply the original clock into 1/3 divided circuit 72. If 1/3 divider circuit 72 outputs only one clock, switch 71 is switched backed to supply the original clock into 1/4 divider circuit 73.

To delay the timing of the sampling clock as shown in FIG. 2C, switch 71 is switched to supply the original clock into 1/5 divider circuit 74. If 1/5 divider circuit 74 outputs only one clock, switch 71 is switched backed to supply the original clock into 1/4 divider circuit 73.

Figure 4:
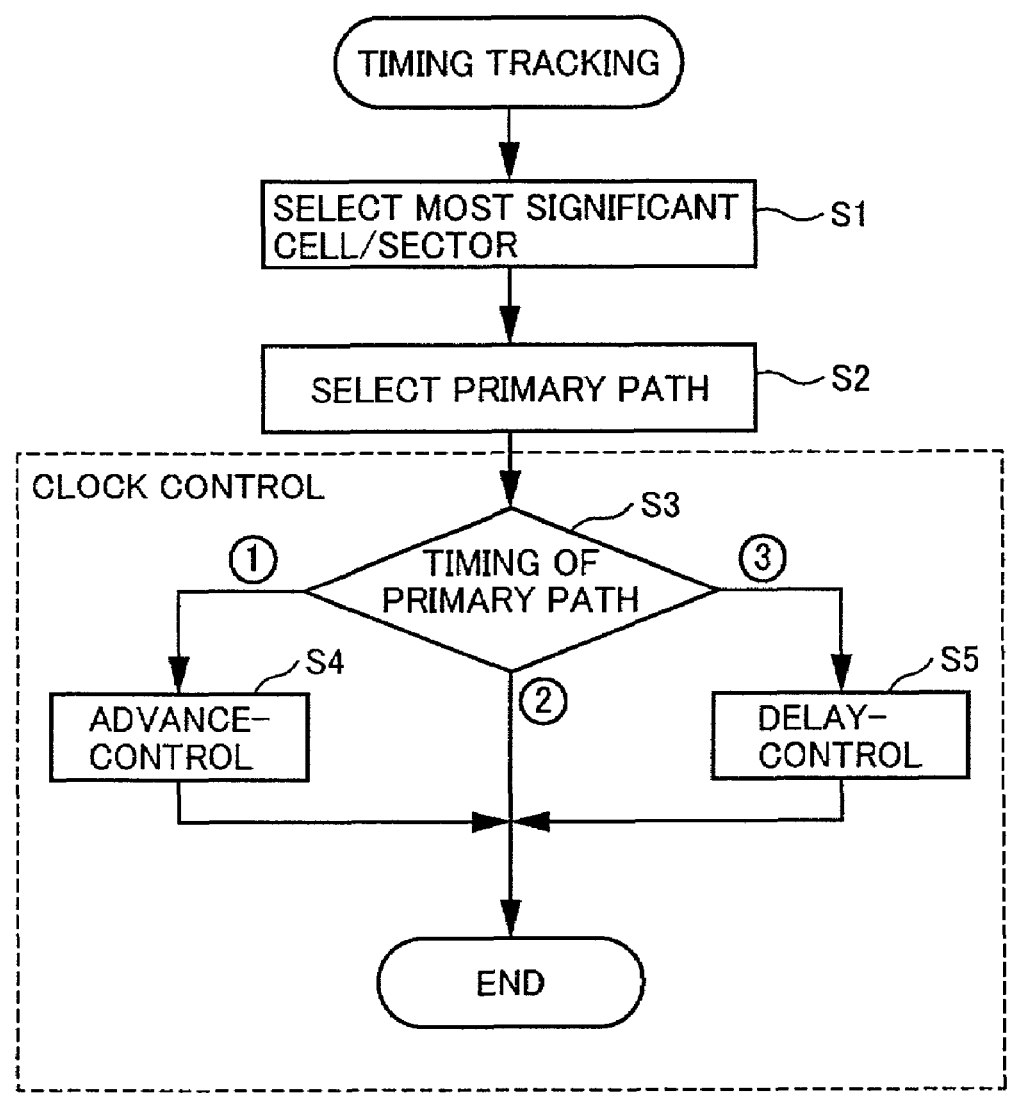
FIG. 4 shows a process flowchart for a mobile communication terminal in the first embodiment of the invention.

FIG. 4 shows a process flowchart of the mobile communication terminal of this embodiment. At first, control unit 4 selects the most significant cell/sector (S1). The cell is usually divided into a multiple sector zones, and handover control between the sectors is performed. As in a conventional implementation the sector of the highest receiving level is selected as the most significant cell/sector. Control unit 4 follows to select the primary path (S2).

Figure 5:
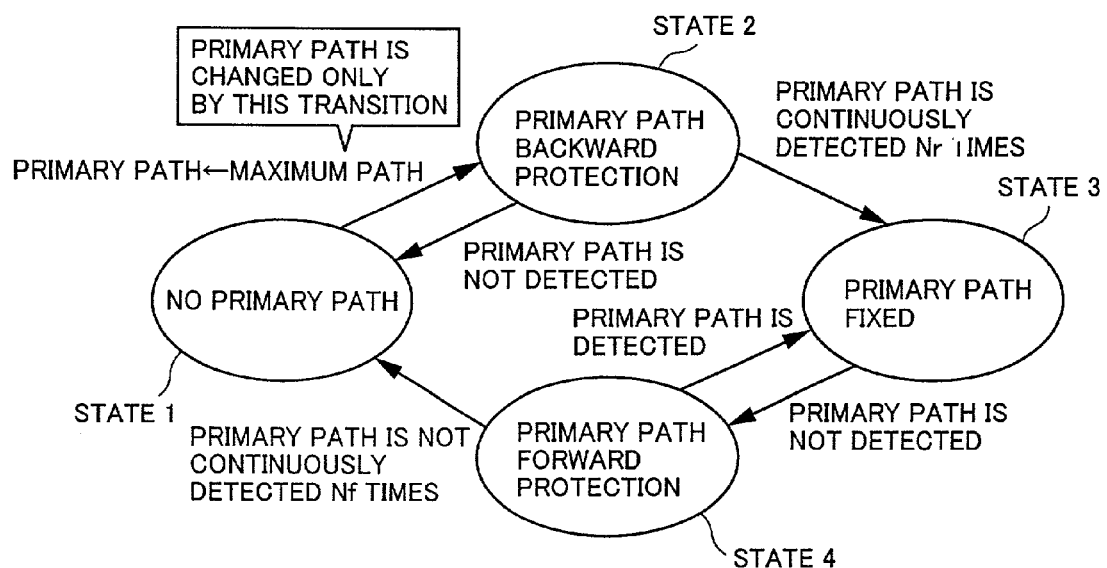
FIG. 5 shows primary path selection procedures.

FIG. 5 shows the selection procedure of the primary path. In state 1, no primary path is present. This state is achieved at the start of communication or change of the primary path. In states 2, 3 and 4 the primary path is in backward protection fixed and forward protection states, respectively.

Usually, a signal to identify frame boundaries is added to a part of received data so that the timing of the mobile communication terminal may be correctly adjusted relative to the frame alignment of the received signal. This control signal synchronizes the mobile communication terminal and the received signal.

For example, when the primary path is not present (state 1), the path of the most significant receiving level is selected as the primary path, and the current state changes to state 2. If the primary path is continuously detected for Nr times when the primary path is in the backward alignment (state 2), the current state changes to state 3. If the primary path is not detected, the current state changes to state 1. If the primary path is not detected when the primary path is fixed (state 3), the current state changes to state 4. If the primary path is detected when the primary path is in forward protection (state 4), the current state changes to state 3. If the primary path is not continuously detected for Nf times, the current state changes to state 1. After the primary path is fixed in this manner, the primary path remains unchanged unless the primary path is continuously detected for Nf times. This procedure can prevent frequent change of the primary path.

Descriptions on FIG. 4 continue. The primary path is changed in step S3, and if the new primary path is advanced relative to the last primary path (S3, ①), control unit 4 controls clock generator 7 to advance the clock as shown in FIG. 2B (S4). When the primary path remains the same (S3, ②), the procedure ends. When the primary path is changed, and the changed primary path is delayed relative to the last primary path (S3, ③), control unit 4 controls clock generator 7 to delay the clock as shown in FIG. 2C (S5).

As described above, the mobile communication terminal in this embodiment performs primary path selection by detecting forward protection or backward protection state of the primary path, and the primary path is changed only when the primary path is in the forward alignment state, and the primary path is not continuously detected for Nf times. This procedure can prevent degradation in the receiving quality due to short cycle transition of the primary path.

According to the controlling method of the sampling clock, only a single clock with different frequency is inserted to control the sampling clock timing, which makes clock control easy to perform. Therefore, the clock can be controlled easily.

SECOND EMBODIMENT

A mobile communication terminal in the second embodiment of the present invention differs from that in the first embodiment in FIG. 1 only in respect to the procedure of the control unit. The procedure of a mobile communication terminal in the second embodiment differs from that of a mobile communication terminal in the first embodiment in FIG. 4 only in respect to the selecting procedure of the most significant cell/sector in step S1. Accordingly, descriptions of the common structures and functions are not repeated. In the description of this embodiment, a reference number "4a" indicates the control unit, and step S1a substitutes for step S1.

Figure 6:
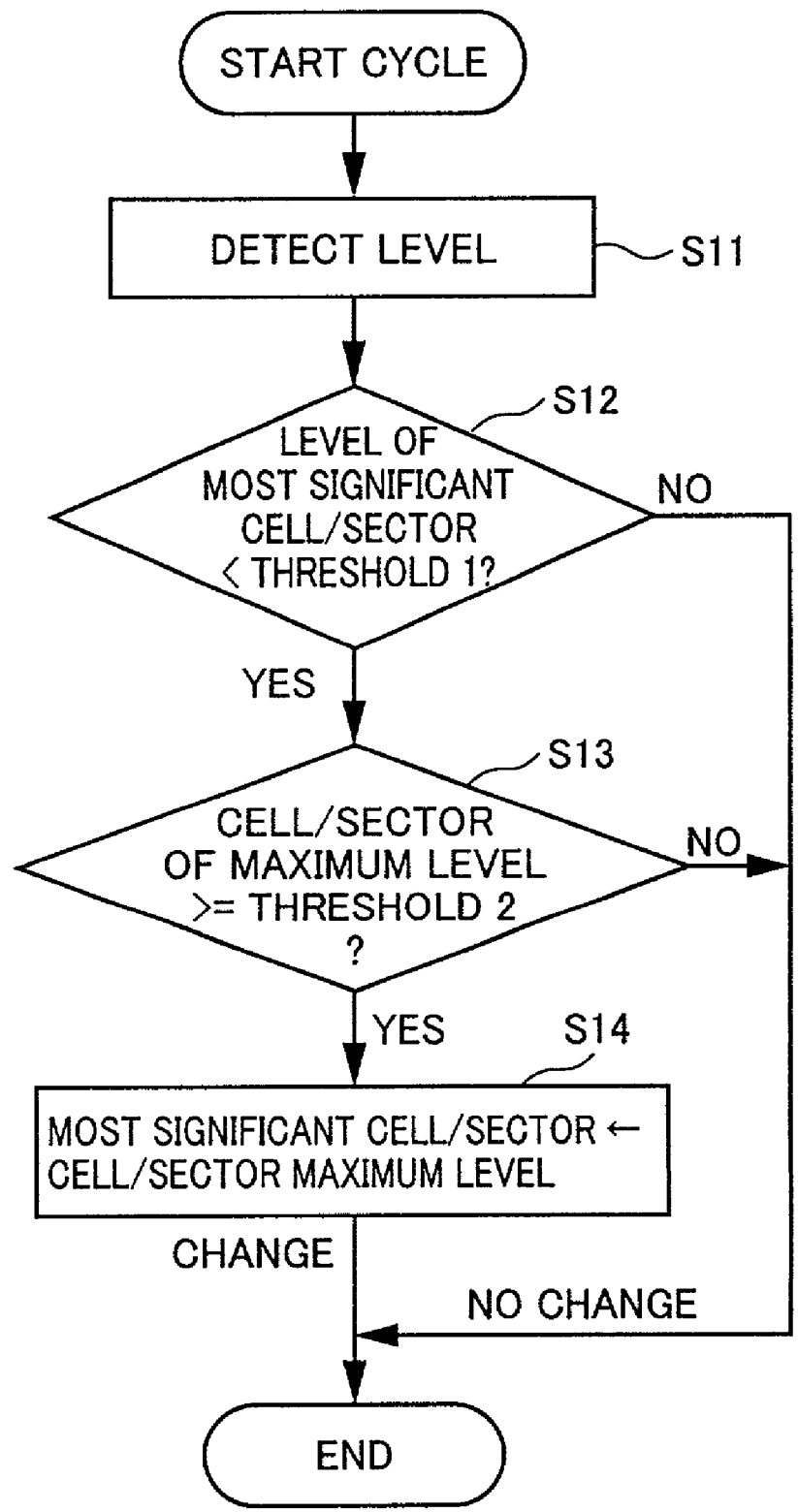
FIG. 6 shows a process flowchart of most significant cell/sector selection preformed by a mobile communication terminal in the second embodiment of the invention.

FIG. 6 shows process flowchart for more details on the most significant cell/sector selection (S1a) of the mobile communication terminal in this embodiment. Thresholds 1 and 2 represent different receiving levels, respectively, and threshold 1 is lower than threshold 2.

At first, control unit 4a acquires the receiving level of the most significant cell/sector from demodulator 5 (S1), to determine whether the acquired receiving level is lower than threshold 1 or not (S12). If the receiving level of the most significant cell/sector is equal to or higher than threshold 1 (No in S12), control unit 4a ends the procedure. If the receiving level of the most significant cell/sector is lower than threshold 1 (Yes in S12), control unit 4a acquires the highest receiving level among those of the sectors from demodulator 5, to determine whether the receiving level is equal to or higher than threshold 2 or not (S13).

If the highest receiving level of the sector is lower than threshold 2 (No in S13), control unit 4a ends the procedure. If the highest receiving level of the sector is equal to or higher than threshold 2 (Yes in S13), control unit 4a selects the sector of the highest receiving level as the new most significant cell/sector (S14), and ends the procedure.

Figure 7A:
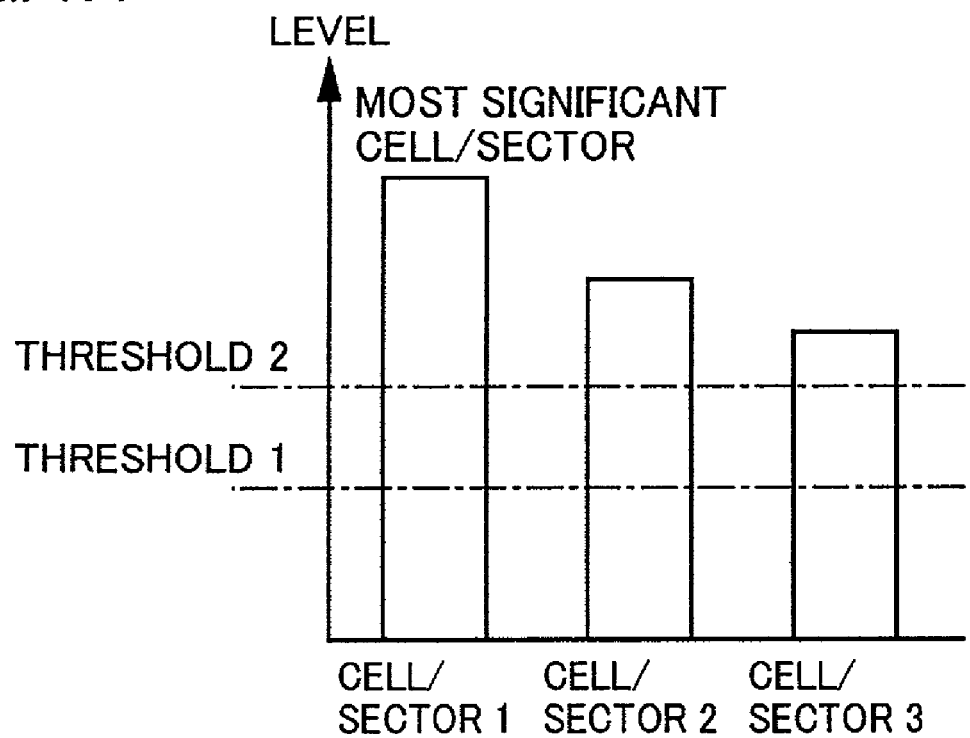
FIGS. 7A and 7B show receiving levels in the case of reselecting the most significant cell/sector.
Figure 7B:
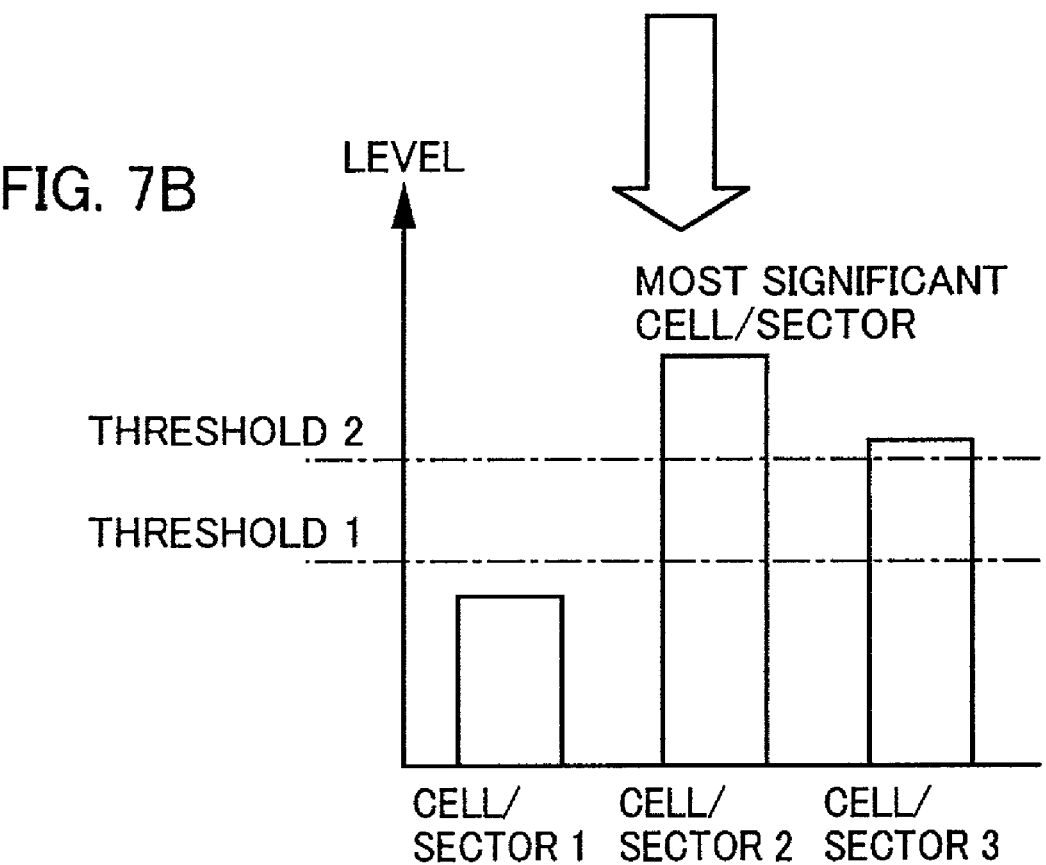

FIGS. 7A and 7B show the receiving levels in the case of changing the most significant cell/sector. As shown in FIG. 7A, if the receiving level of the most significant cell/sector (cell/sector 1) is equal to or higher than threshold 1, the most significant cell/sector remains the same. When the receiving level of the most significant cell/sector (cell/sector 1) becomes lower than threshold 1 as in FIG. 7B, cell/sector 2 is selected as the new most significant cell/sector since the largest receiving level of the cell/sector 2 is equal to or higher than threshold 2. In FIG. 7B, if both the receiving levels of cell/sector 2 and cell/sector 3 are lower than threshold 2, and also lower than the receiving level of cell/sector 1 cell/sector 1 remains as the most significant cell/sector.

As already described, the mobile communication terminal in this embodiment changes the primary path only when the receiving level of the most significant cell/sector is lower than threshold 1, and the highest receiving level of the sector is equal to or higher than threshold 2. This procedure can prevent degradation in the receiving quality due to short cycle transition of the most significant cell/sector.

THIRD EMBODIMENT

A mobile communication terminal of the third embodiment of the present invention differs from that in the first embodiment shown in FIG. 1 only in respect to the procedure of the control unit. The procedure of the mobile communication terminal in the third embodiment differs from that of the mobile communication terminal in the first embodiment in FIG. 4 only in respect to the selecting procedure of the most significant cell/sector in step S1. Accordingly, descriptions of the common structures and functions are repeated. In this embodiment, a reference number "4b" indicates the control unit, and step S1b substitutes for step S1.

Figure 8:
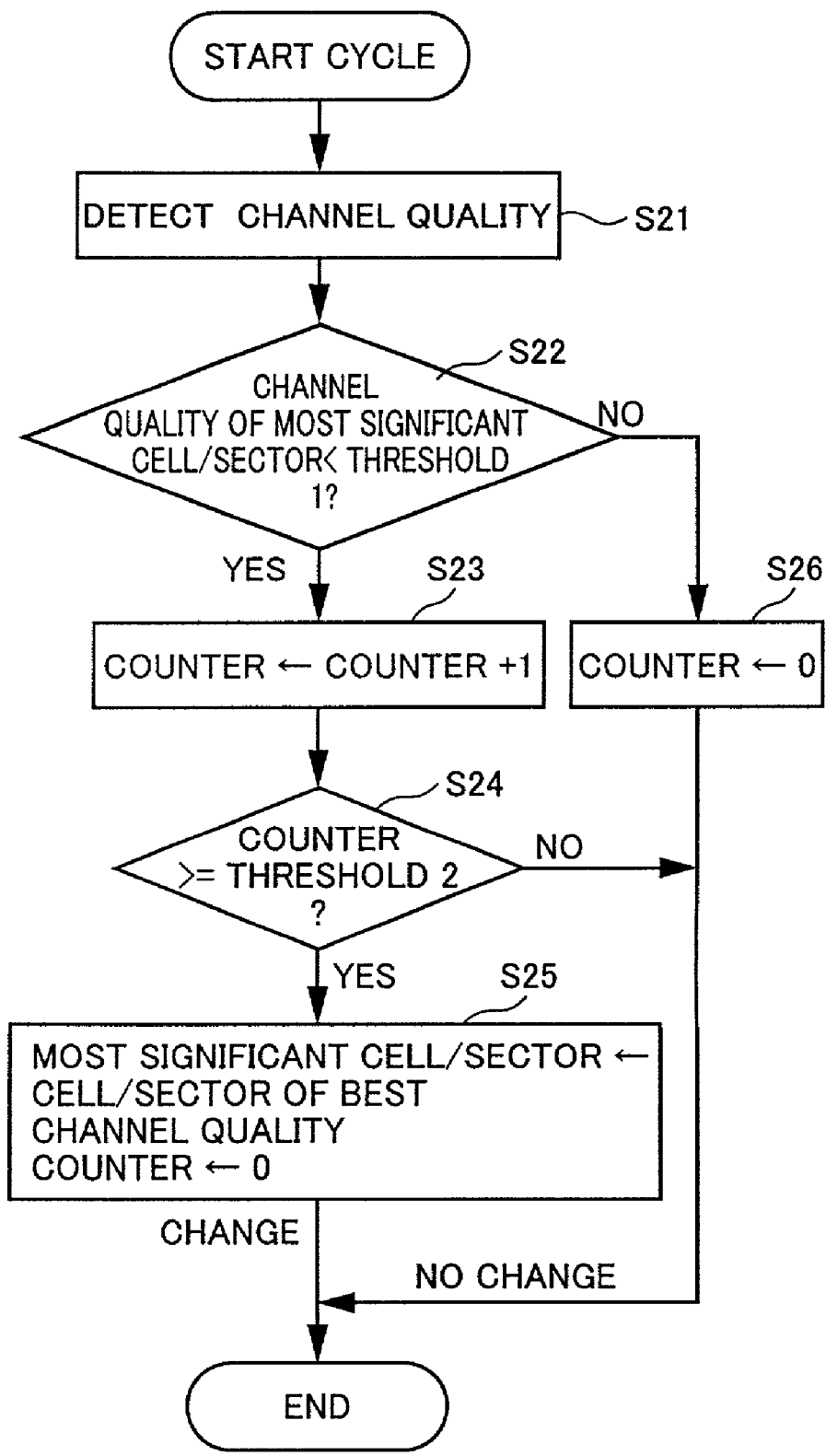
FIG. 8 shows a process flowchart of most significant cell/sector selection performed by a mobile communication terminal in the third embodiment of the invention.

FIG. 8 shows a process flowchart for the more detailed description of the most significant cell/sector selection (S1b) of a mobile communication terminal in this embodiment. Threshold 1 represents a quality of channels/channel quality threshold, and threshold 2 represents a counter threshold. The quality of channels/channel quality depends on the number of bit errors which are counted for a specified time period.

At first, control unit 4b detects the quality of channels/channel quality at the most significant cell/sector reception (S21), and determines whether the detected quality of channels/channel quality is lower than threshold 1 or not (S22). If the quality of channels/channel quality of the most significant cell/sector is equal to or higher than threshold 1 (No in S22), control unit 4b sets the counter to "0" (S26), and ends the procedure. If the quality of channels/channel quality of the most significant cell/sector is lower than threshold 1 (Yes in S22), control unit 4b increments the counter (S23), and determines whether the counter value is equal to or higher than threshold 2 or not (S24).

If the counter value is lower than threshold 2 (No in S24), control unit 4b ends the procedure. If the counter value is equal to or higher than threshold 2 (Yes in S24), control unit 4b selects the sector of the best quality of channels/channel quality as the new most significant cell/sector, sets the counter to "0" (S25) and ends the procedure.

Figure 9A:
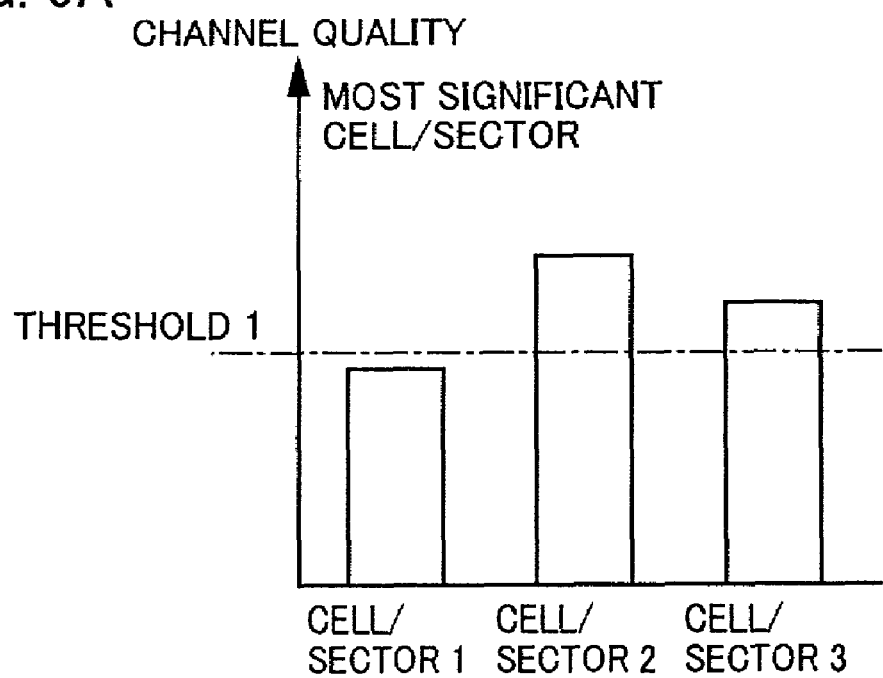
FIGS. 9A and 9B show line qualities in the case reselecting the most significant cell/sector.
Figure 9B:
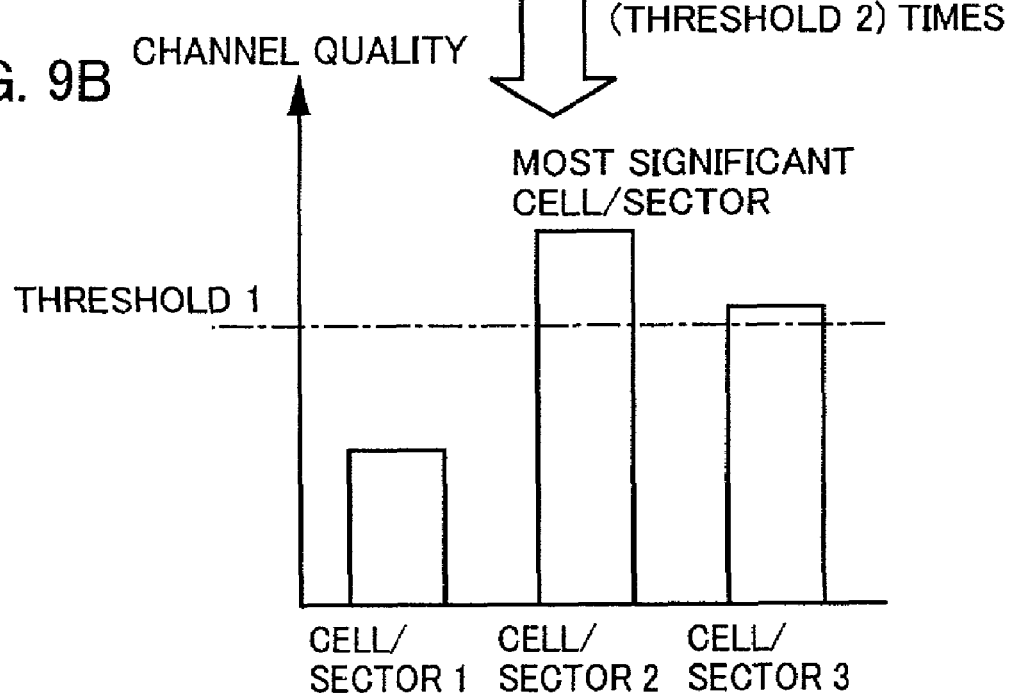

FIGS. 9A and 9B show line qualities in the case of changing the most significant cell/sector. If the quality of channels/channel quality of most significant cell/sector (cell/sector 1) becomes lower than threshold 1 as in FIG. 9A, the counter is incremented. However, as long as the counter value is lower than threshold 2, the most significant cell/sector remains the same.

If the quality of channels/channel quality of the most significant cell/sector (cell/sector 1) remains lower than threshold 1, and the counter value is incremented to or above threshold 2, cell/sector 2 of the best quality of channels/channel quality is selected to substitute as the most significant cell/sector as in FIG. 9B. If the quality of channels/channel quality of the most significant cell/sector (cell/sector 1) becomes equal to or higher than threshold 1 before the counter value becomes equal to or higher than threshold 2, the counter is reset to "0", and returns to the initial state.

As described above, a mobile communication terminal in this embodiment selects the sector of the best quality of channels/channel quality as the most significant cell/sector only if the quality of channels/channel quality of the most significant cell/sector remains lower than threshold 1 for a specified time. This procedure can prevent degradation in the receiving quality due to short cycle transition of the most significant cell/sector.

FOURTH EMBODIMENT

A mobile communication terminal in the fourth embodiment of the invention differs from that of the first embodiment shown in FIG. 1 only in respect to the procedure of the control unit. The procedure of the mobile communication terminal in the fourth embodiment differs from that of the mobile communication terminal in the first embodiment in FIG. 4 only in respect to the selection procedure of the most significant cell/sector in step S1. Accordingly, descriptions of the common structures and functions are not repeated. In this embodiment, a reference number "4c" indicates the control unit, and a step S1c substitutes for step S1.

Figure 10:
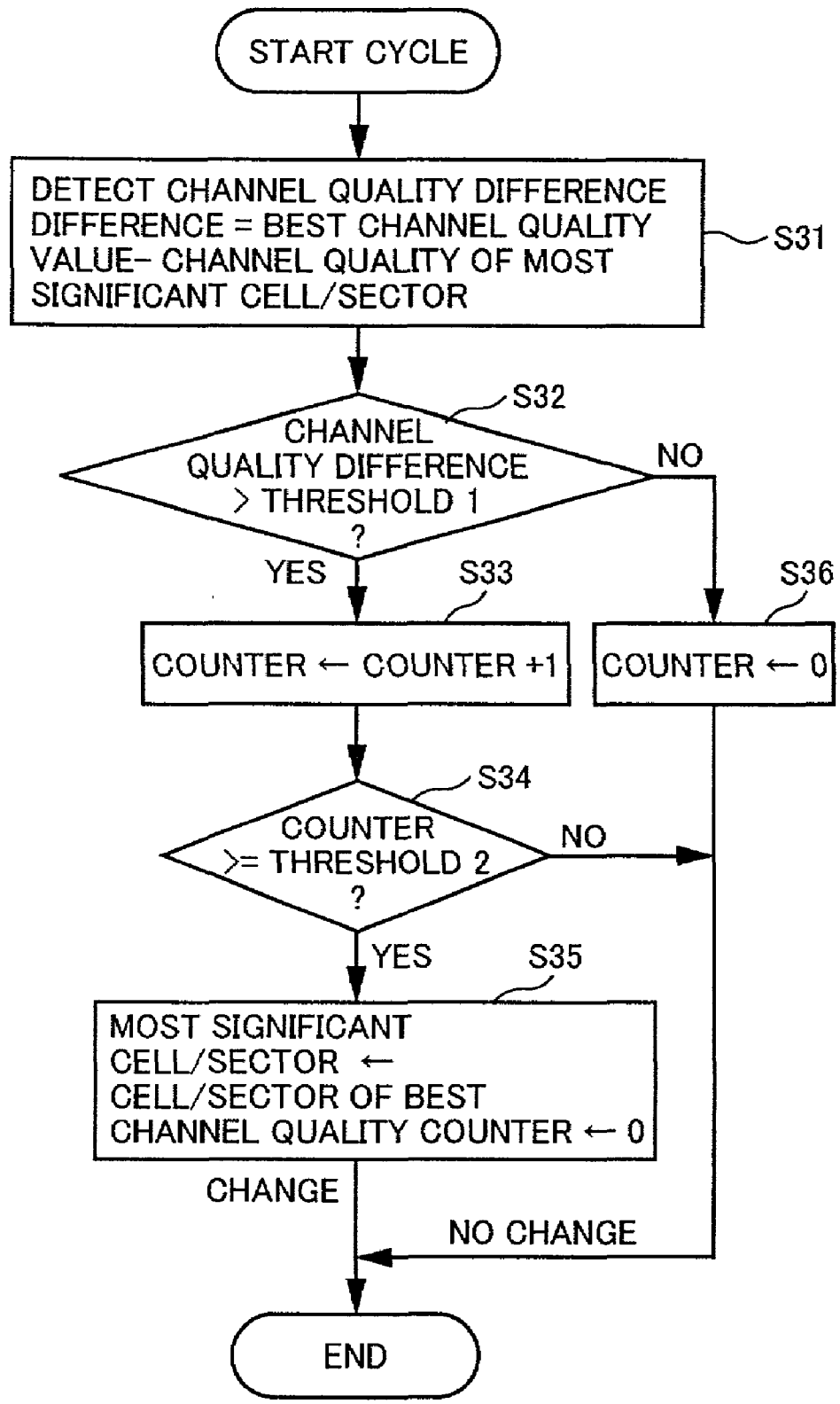
FIG. 10 shows a process flowchart of most significant cell/sector selection performed by a mobile communication terminal in the fourth embodiment of the invention.

FIG. 10 shows a process flowchart for more detailed description of the most significant cell/sector selection (S1c) of a mobile communication terminal in this embodiment. Threshold 1 represents a threshold of quality of channels/channel quality difference, and threshold 2 represents a counter threshold. The quality of channels/channel quality difference represents a difference between the highest of the line qualities of cell/sector and the quality of channels/channel quality of the most significant cell/sector.

At first, control unit 4b detects difference in quality of channels/channel quality between the most significant cell/sector and another cell/sector (S31), and determines whether the detected quality of channels/channel quality difference exceeds threshold 1 or not (S32). If the quality of channels/channel quality difference is equal to or smaller than threshold 1 (No in S32), control unit 4c sets the counter to "0" (S36), and ends the procedure. If the quality of channels/channel quality difference exceeds threshold 1 (Yes in S32), control unit 4c increments the counter (S33), and determines whether the counter value is equal to or larger than threshold 2 or not (S34).

If the counter value is lower than threshold 2 (No in S34), control unit 4c ends the procedure. If the counter value is equal to or higher than threshold 2 (Yes in S34), control unit 4c selects the sector of the best quality of channels/channel quality to substitute the current most significant cell/sector, sets the counter to "0" (S35), and ends the procedure.

Figure 11A:
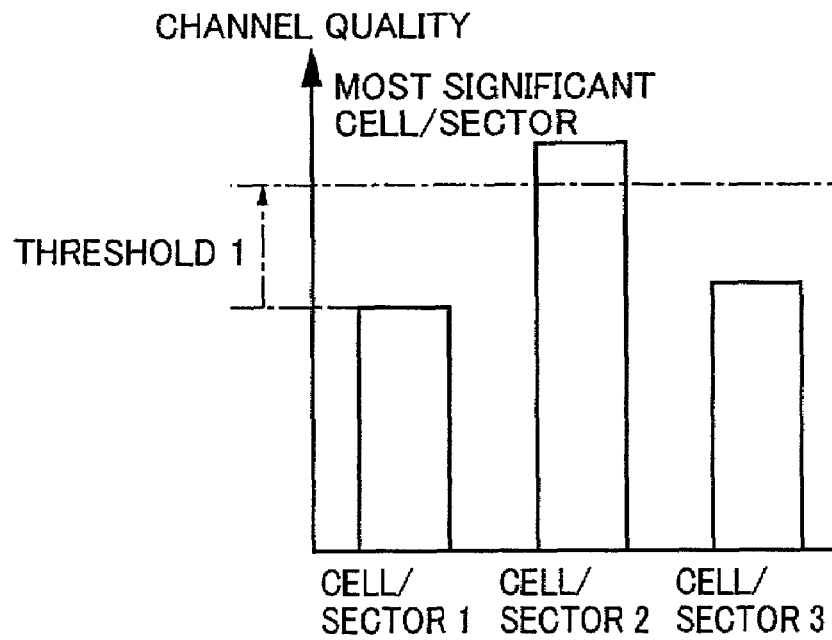
FIGS. 11A and 11B show quality of channels/channel quality differences in the case of reselecting the most significant cell/sector.
Figure 11B:
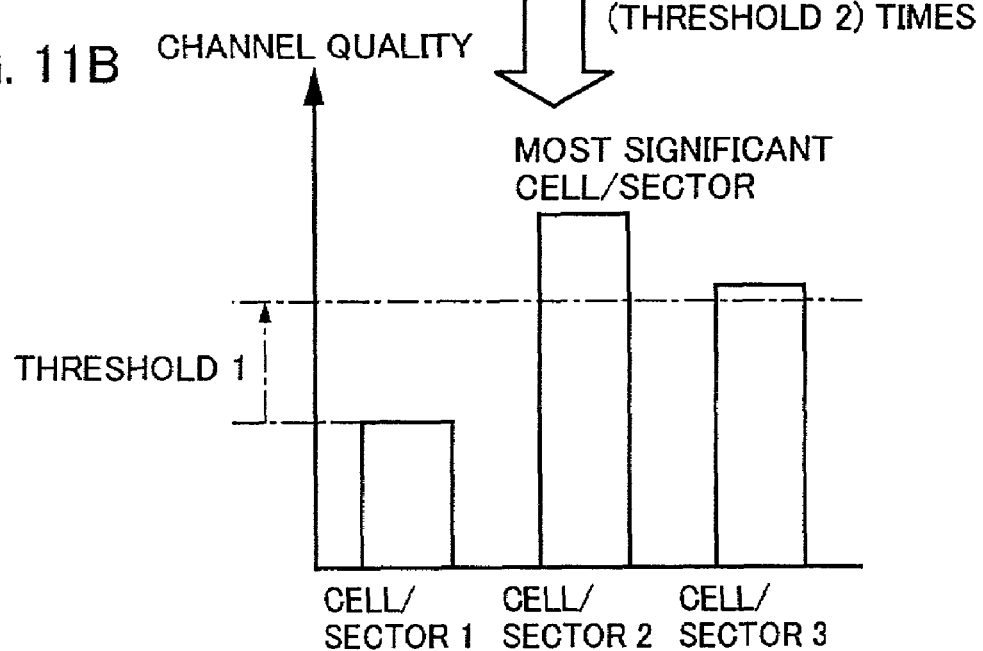

FIGS. 11A and 11B show quality of channels/channel quality differences in the case of changed most significant cell/sector. When the quality of channels/channel quality of most significant cell/sector (cell/sector 1) deteriorates to the point of increasing the quality of channels/channel quality difference to exceed threshold 1 as shown in FIG. 11A, the counter is incremented. However, if the counter value is lower than threshold 2, the most significant cell/sector remains the same.

If the quality of channels/channel quality difference of the most significant cell/sector (cell/sector 1) continues to exceed threshold 1, and the counter value is incremented to or above threshold 2, cell/sector 2 of the best quality of channels/channel quality is selected as the most significant cell/sector as shown in FIG. 11B. If the quality of channels/channel quality difference becomes equal to or lower than threshold 1 sooner than counter value becomes equal to or higher than threshold 2, the counter is set to "0", and returns to the initial state.

As described above, a mobile communication terminal in this embodiment select the sector of the best quality of channels/channel quality as the most significant cell/sector only if the quality of channels/channel quality difference remains larger than threshold 1 for a specified time. This procedure can prevent degradation in the receiving quality due to short cycle transition of the most significant cell/sector.

FIFTH EMBODIMENT

A mobile communication terminal in the fifth embodiment of the present invention differs from the mobile communication terminal in the first embodiment in FIG. 1 only in respect to the procedure of the control unit. The procedure of the mobile communication terminal in the fifth embodiment differs from that of the mobile communication terminal in the first embodiment in FIG. 4 only on the point that the clock control procedures in steps S41–S47 substitute for S3–S5. Accordingly, descriptions of the common structures and functions are not repeated. In this embodiment, a reference number "4d" indicates the control unit.

Figure 12:
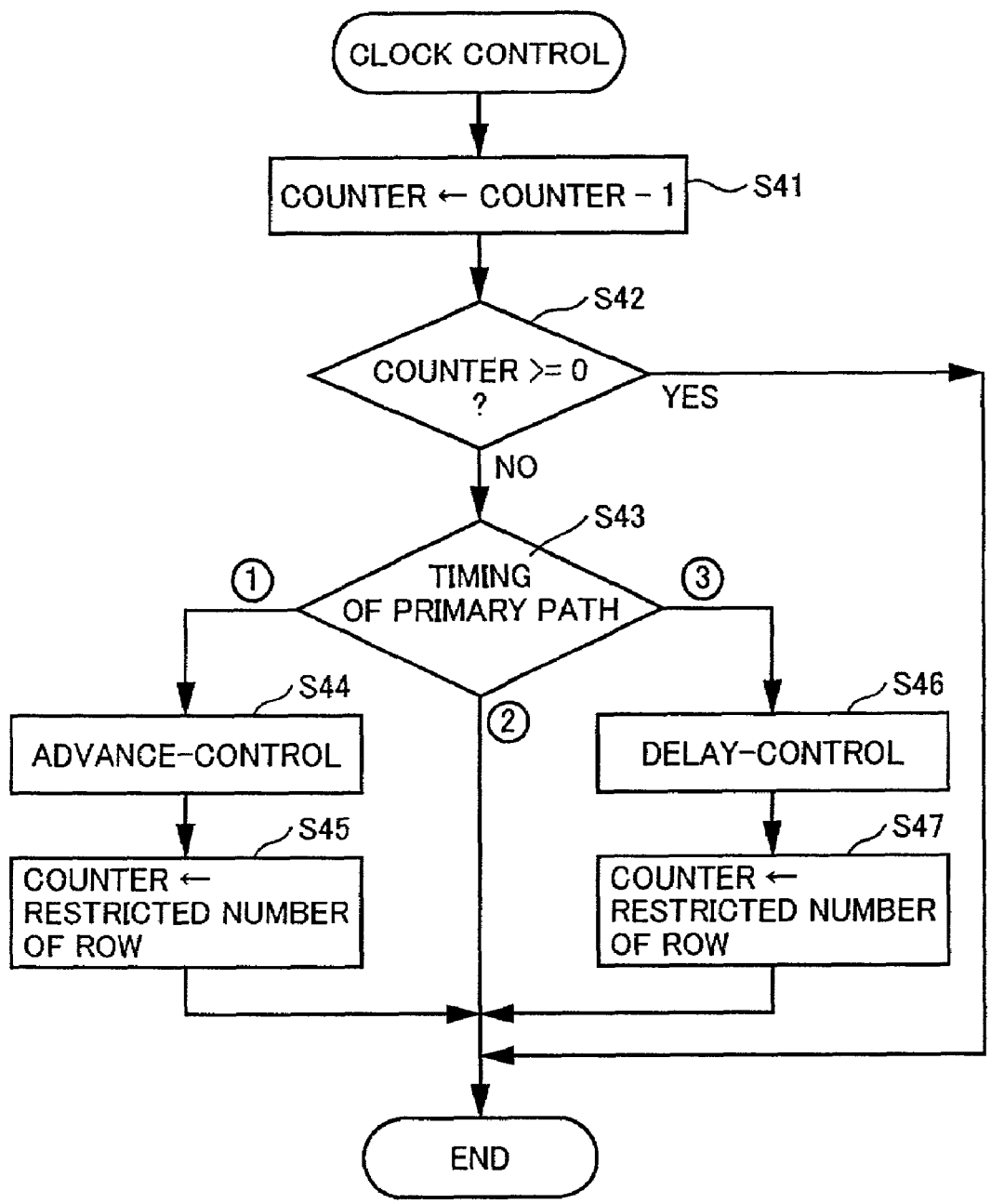
FIG. 12 shows a process flowchart of clock control performed by a mobile communication terminal in the fifth embodiment of the invention.
Figure 13:
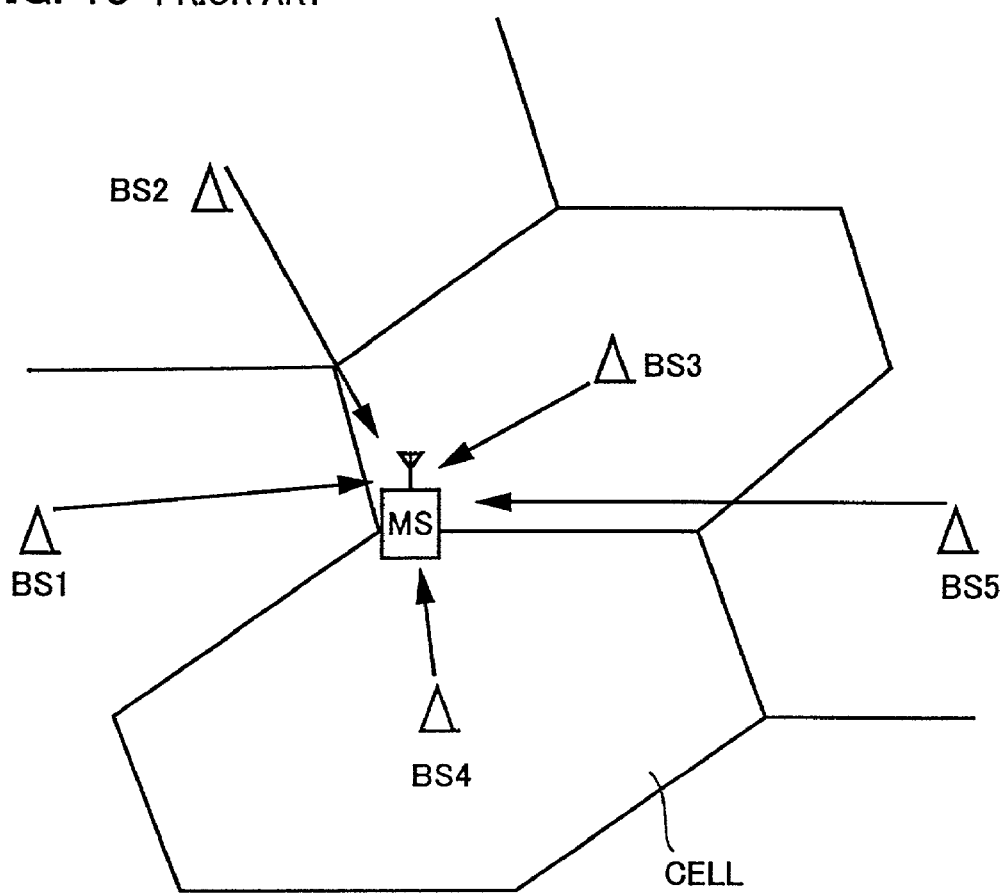
FIG. 13 shows occurrence of a handover.

FIG. 12 shows a process flowchart of the clock control performed by a mobile communication terminal in this embodiment. At first, control unit 4d decrements the counter value (S41), and determines whether the counter value is equal to or higher than 0 or not (S42). If the counter value is equal to or higher than 0 (Yes in S42), control unit 4d ends the procedure. If the counter value is lower than 0 (No in S42), control unit 4d determines the timing of the primary path (S43).

When the primary path is changed, and the new primary path is advanced relative to the last primary path (① in S43), control unit 4d controls clock generator 7 to advance the clock timing as in FIG. 2B (S44), sets a restricted number of row in the counter the clock timing (S45), and ends the procedure. If the primary path remains unchanged (② in S43), the procedure ends. If the primary path is changed, and the new primary path is delayed relative to the last primary path (③ in S43), control unit 4d controls clock generator 7 to delay the clock timing as in FIG. 2C (S46), sets a restricted number of row of rows in the counter (S47), and ends the procedure.

As described above, a mobile communication terminal of this embodiment sets the restricted number of row of rows in the counter, and the clock control is not performed until the counter value becomes equal to or lower than 0. This procedure can prevent degradation in the receiving quality due to frequent change in the clock timing.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A mobile communication terminal comprising:
   a receiver receiving a radio wave from a base station;
   a sampling unit sampling a signal received by said receiver;
   a demodulator demodulating the signal sampled by said sampling unit;
   a cell selector selecting a most significant cell/sector based on data demodulated by said demodulator;
   a path detector detecting multiple paths based on the signal sampled by said sampling unit; and
   a clock generator generating sampling clocks with changed timing by inserting different frequency clocks into the sampling clock based on the cell/sector selected by said cell selector and based on the primary path detected by said path detector, and supplying the sampling clock to said sampling unit.

2. The mobile communication terminal according to claim 1, wherein said clock generator inserts one different frequency clock into the sampling clock to change the timing of said sampling clock.

3. The mobile communication terminal according to claim 1, wherein said mobile communication terminal is a mobile communication terminal employing a code division multiple access system.

4. A mobile communication terminal comprising:
   a receiver receiving a radio wave from a base station;
   a sampling unit sampling a signal received by said receiver;
   a demodulator demodulating the signal sampled by said sampling unit;
   a cell selector selecting a most significant cell/sector based on data demodulated by said demodulator;
   a path detector detecting multiple paths based on the signal sampled by said sampling unit;
   a determining unit detecting a primary path from the multiple paths detected by said path detector, and determining whether said primary path is to be changed or not, based on the states of the forward alignment and backward alignment of said primary path; and
   a clock generator generating a sampling clock with changed timing based on a result of the determination by said determining unit, and supplying the sampling clock to said sampling unit.

5. The mobile communication terminal according to claim 4, wherein
   said determining unit determines whether the primary path is to be changed or not, by transference of the state between:
   a first state that no primary path is present,
   a second state that the primary path is in a state of backward protection,
   a third state that the primary path is in a fixed state, and
   a fourth state that the primary path is in a state of forward protection.

6. The mobile communication terminal according to claim 5, wherein said determining unit transfers the state from the first state to the second state, and determines that the primary path is to be changed when the primary path is detected in the first state.

7. The mobile communication terminal according to claim 5, wherein said determining unit transfers the state from said second state to said third state when the primary path is continuously detected multiple times.

8. The mobile communication terminal according to claim 5, wherein said determining unit transfers the state from said fourth state to said first state when the primary path is not continuously detected multiple times.

9. The mobile communication terminal according to claim 4, wherein said clock generator generates the sampling clock with changed timing based on the primary path determined by said determining unit at regular intervals.

10. The mobile communication terminal according to claim 4, wherein said mobile communication terminal is a mobile communication terminal employing a code division multiple access system.

11. A mobile communication terminal comprising:
- a receiver receiving a radio wave from a base station;
- a sampling unit sampling a signal received by said receiver;
- a cell selector selecting a most significant cell/sector based on signal sampled by said sampling unit, using at least two different threshold; and
- a path detector detecting multiple paths based on the signal sampled by said sampling unit.

12. The mobile communication terminal according to claim 11, wherein said selecting unit selects a sector/cell of the maximum receiving level as a new most significant cell/sector when a receiving level of the current most significant cell/sector is smaller than a first threshold, and said maximum receiving level of the sector/cell is equal to or higher than a second threshold which is higher than said first threshold.

13. The mobile communication terminal according to claim 11, wherein said selecting unit selects the cell/sector of the maximum quality of channels as a new most significant cell/sector when a quality of channels of the current most significant cell/sector is worser than a first threshold for a period of a second threshold or more.

14. The mobile communication terminal according to claim 11, wherein said selecting unit selects the cell/sector of the maximum quality of channels as a new most significant cell/sector when a difference between the maximum quality of channels of the sectors and the quality of channels of the current most significant cell/sector is higher than a first threshold for a period of a second threshold or more.

15. The mobile communication terminal according to claim 11, wherein said mobile communication terminal is a mobile communication terminal employing a code division multiple access system.

* * * * *